July 12, 1932.  N. MACLEAN ET AL  1,867,518

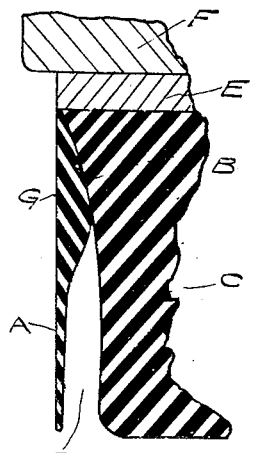
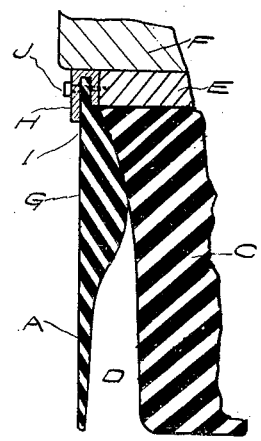
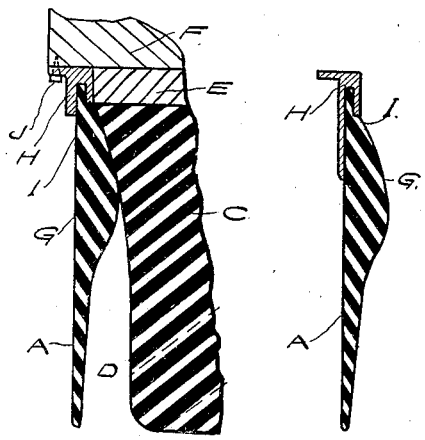
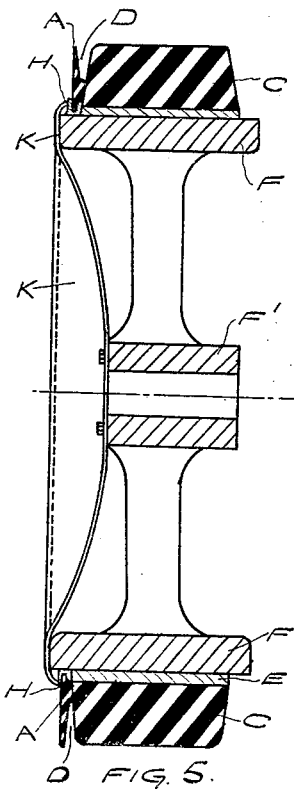
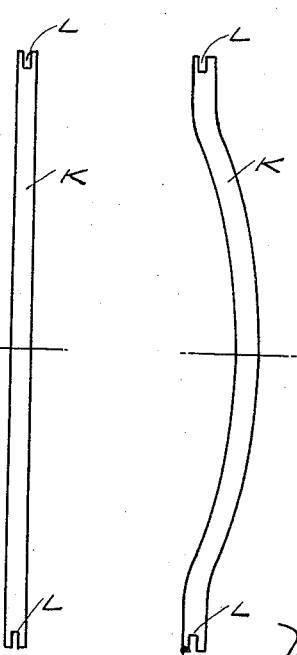

MUD GUARD FOR MOTOR CARS, MOTOR CYCLES, OR OTHER WHEELED VEHICLES

Filed April 10, 1928  2 Sheets-Sheet 2

Patented July 12, 1932

1,867,518

UNITED STATES PATENT OFFICE

NEIL MACLEAN, THOMAS QUINN, AND FRANCIS DUFFY, OF GLASGOW, SCOTLAND

MUD GUARD FOR MOTOR CARS, MOTOR CYCLES, OR OTHER WHEELED VEHICLES

Application filed April 10, 1928, Serial No. 268,968, and in Great Britain May 7, 1927.

Our invention relates to improvements in mud guards for motor cars, motor cycles and other wheeled vehicles of the kind referred to in our earlier application filed February 8th, 1928, No 252,883, and has for its object cheapness in construction and greater efficiency.

According to this invention, the guard is formed with a thickened part by which the guard is held away from the tyre in order to leave a space between the guard and the tyre. That portion of the guard which extends beyond the thickened portion diminishes in thickness to a substantially feather edge without extending laterally outwards from the tyre, by which the splash-guard accommodates itself to the tyre when rubbing against the curb and returns to its normal position parallel to the wheel when the vehicle is travelling. The feather-edge cuts the water or mud in such a manner that no splash is made by the splash-guard. The over-all diameter of the splash guard is always less than the effective over-all diameter of the tyres whether solid of pneumatic, all hereinafter described with reference to the drawings and pointed out in the claim.

In order that our invention may be properly understood and readily carried into effect, we have hereunto appended two sheets of drawings; of which Figure 1 is a part cross section of a solid tyre showing anti-splash guard vulcanized to said tyre.

Figures 2 and 3 are similar views showing different methods of attachment of the anti-splash guard to the wheel.

Figure 4 is a cross section of another form of anti-splash guard.

Figure 5 is a cross section of a wheel and tyre and means of attachment of anti-splash guard.

Figures 6, 7 and 8 are views of different forms of discs for attachment of the anti-splash guard to the wheel.

Referring to Figure 1 of the drawings, A is the guard which is vulcanized to the tyre C at B, the thickened part G of the guard A holding the guard A away from the tyre C and thereby leaving a space D between the guard A and the tyre C. E is a ring to which the tyre C is vulcanized and F is the rim of the wheel upon which the ring E is fixed.

Referring to Figures 2 and 3 of the drawings, these show methods by which the guards A may be additionally fixed. A ring H having a groove I is provided into which the inner edge of the guard A is fitted, the ring H being suitably attached to the ring E by bolts or screws J, or to the rim F of the wheel, Figure 3.

Referring to Figure 4 of the drawings, this shows another form of the ring H with part of it extended on outside of guard A to aid in holding the guard A against the tyre C.

Referring to Figure 5 of the drawings, this shows section of motor wheel with solid tyre and method of attaching the guard A with a disc K fixed to the boss F' of the wheel. The outer edge of the disc K is brought round the rim F and bears against the ring H to which the guard A is attached and holds the guard A in position. Or the guard A may be fixed to the outer edge of the disc K by means of a groove therein shown at L in Figures 6, 7 and 8.

Referring to Figures 6, 7 and 8 of the drawings, which show different forms of discs K, and which discs K are fixed to the boss F' of the wheel as in Figure 5, the outer edge of the disc has a suitable slot to which the guard A may be suitably fixed in position. The disc K may be concave, convex or straight to suit the type of wheel.

Figure 9:
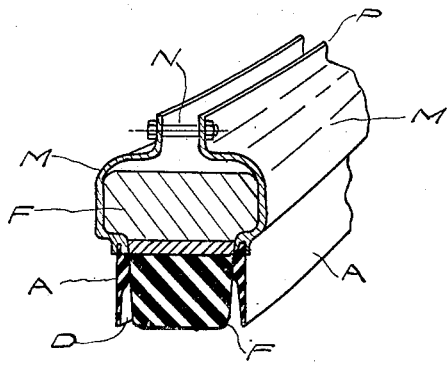
Figure 9 is a cross section showing part of rim and tyre of wheel and method of attachment of anti-splash guard.

Referring to Figure 9 of the drawings, this shows the guard A on both sides but may be on either side of the tyre C as may be found necessary and held in position by rings M. These rings M are suitably shaped to adapt themselves to the rim F of the wheel, said rings M being clamped to the wheel by screws or bolts N. The rings M may be so shaped at P, Figure 9, as to be adaptable for disc or spoke wheels.

Figures 10, 11:
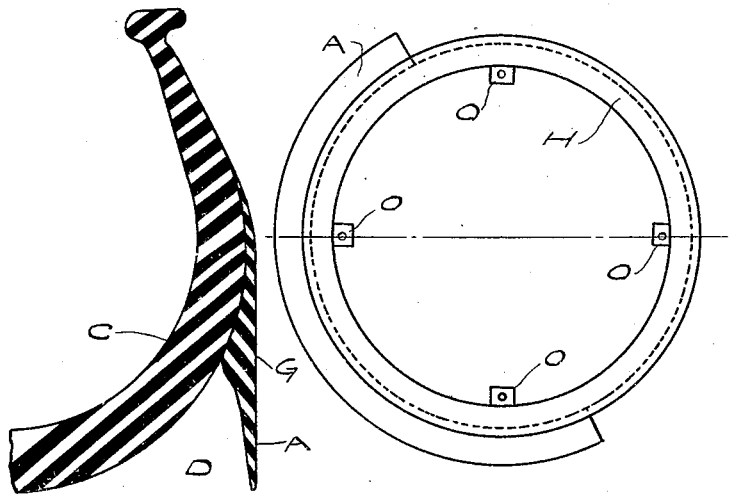
Figure 10 is part cross section of pneumatic tyre showing the anti-splash guard vulcanized to said tyre.
Figure 11 is a side view of a ring for attachment of anti-splash guard to the wheel.

Referring to Figure 10 of the drawings, this shows the guard A as applied to a pneumatic tyre C thickened at G to hold the guard A away from the tyre C, D representing the space between the tyre C and the guard into which the mud or such like is raised.

Referring to Figure 11 of the drawings, this shows a different form of attachment of the ring H to the wheel, lugs O forming part of the ring H are so formed as to enter the said ring H to be attached to the wheel by means of bolts or such like.

In place of having the ring H, as shown in Figure 11, it may be made in two parts, an inner and an outer ring clamped together by screws or such like to hold the guard A in position.

The guard A may be in one piece or it may be in several sections.

We claim:

A wheel having a splash guard comprising a ring of flexible material arranged on one side of the wheel rim and a second ring having a groove therein in which the inner edge of the guard is fitted, and a disc secured to the post of the wheel and bearing at its peripheral edge on the second ring to clamp the latter in place.

In witness whereof we affix our signatures.

NEIL MACLEAN.
THOMAS QUINN.
FRANCIS DUFFY.